(12) United States Patent
Johannsen et al.

(10) Patent No.: US 9,457,852 B2
(45) Date of Patent: Oct. 4, 2016

(54) TWIN BUSHING TRACK CHAIN CARTRIDGE

(71) Applicant: Caterpillar Inc., Peoria, IL (US)

(72) Inventors: Eric Johannsen, Washington, IL (US); Roger Recker, Dunlap, IL (US); Jason Sebright, Chillicothe, IL (US); Mark S. Diekevers, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 66 days.

(21) Appl. No.: 14/243,176

(22) Filed: Apr. 2, 2014

(65) Prior Publication Data

US 2014/0210254 A1 Jul. 31, 2014

Related U.S. Application Data

(63) Continuation of application No. 13/092,346, filed on Apr. 22, 2011, now abandoned.

(51) Int. Cl.
*B62D 55/21* (2006.01)
*B62D 55/088* (2006.01)
*B62D 55/092* (2006.01)

(52) U.S. Cl.
CPC ........... *B62D 55/21* (2013.01); *B62D 55/0887* (2013.01); *B62D 55/092* (2013.01); *B62D 55/211* (2013.01); *Y10T 29/4995* (2015.01)

(58) Field of Classification Search
CPC  B62D 55/21; B62D 55/088; B62D 55/0887; B62D 55/092; B62D 55/211
USPC ....... 305/100, 103, 104, 105, 106, 200, 202, 305/203, 204
See application file for complete search history.

(56) References Cited

U.S. PATENT DOCUMENTS

| | | | |
|---|---|---|---|
| 3,218,107 A | | 11/1965 | Reinsma |
| 6,074,023 A | * | 6/2000 | Satou .................... B21C 37/294 305/116 |
| 6,371,577 B1 | | 4/2002 | Hasselbusch et al. |
| 6,382,742 B1 | | 5/2002 | Hasselbusch et al. |
| 6,739,680 B2 | | 5/2004 | Hasselbusch et al. |
| 7,347,513 B2 | | 3/2008 | Johannsen |
| 7,766,433 B2 | | 8/2010 | Mulligan |
| 7,850,256 B2 | | 12/2010 | Mulligan |
| 7,959,239 B2 | | 6/2011 | Diekevers et al. |
| 8,070,241 B2 | * | 12/2011 | Mulligan ............... B62D 55/21 305/195 |
| 8,613,486 B2 | * | 12/2013 | Johannsen ................. 305/118 |
| 9,126,645 B2 | * | 9/2015 | Hasselbusch ...... B62D 55/0887 |

\* cited by examiner

*Primary Examiner* — Kip T Kotter
*Assistant Examiner* — Jean Charleston

(57) ABSTRACT

A cartridge assembly for a track chain is disclosed. The cartridge assembly includes a pin that has a lubricant channel therein. The pin is accommodated in an inner bushing that also has a channel extending therethrough for accommodating the pin. The pin extends beyond either end of the inner bushing. The pin and inner bushing are partially disposed in an outer bushing that also has a channel for accommodating the pin in inner bushing. The ends of the inner bushing and pin extend beyond the ends of the outer bushing. First and second inserts are disposed at either end of the inner bushing. The first and second inserts are disposed between the outer bushing and a pair of opposing collars which are disposed on the ends of the pin beyond the inserts and beyond the ends of the inner bushing. The inserts and collars each include seals. The seals of the collars are supported by one or more thrust rings as opposed to the inserts or partially by the inserts.

5 Claims, 3 Drawing Sheets

TWIN BUSHING TRACK CHAIN CARTRIDGE

This is a continuation of application Ser. No. 13/092,346 filed on Apr. 22, 2011, which is incorporated herein by reference.

TECHNICAL FIELD

An endless track chain for a track type vehicle is disclosed, and, more particularly, a cartridge assembly that acts as a joint for relative rotation between links of the track chain is disclosed.

BACKGROUND

Track type work machines typically have a sprocket, an idler, and a track chain assembly. During use of the work machine, the sprocket rotates and engages the track chain assembly, thereby causing the track chain assembly to rotate around a path defined by the sprocket and the idler. The rotation of the track chain assembly causes the machine to be propelled over the ground so as to perform various work functions.

As shown in U.S. Pat. No. 7,850,256, track chain assemblies generally include a pair of parallel chains, with each parallel chain being made up of a series of track links. Track chain assemblies further include a series of cartridges that include bushings, pins, collars, seals and inserts. The cartridges are interposed between and connected to the links of the parallel chains. The cartridges and the entrained track links cooperate to form a number of track joints which allow the necessary movement of the track links during use of the track chain assembly, for example, when the track chain assembly rotates about the sprocket and the idler.

SUMMARY OF THE DISCLOSURE

In one example, a cartridge assembly for a track chain is disclosed. The cartridge assembly includes a pin that defines a longitudinal access and that has a lubricant channel. The pin includes a first and second opposing ends. The cartridge assembly includes an inner bushing having first and second ends and a channel extending therethrough for rotatably accommodating a portion of the pin disposed between the first and second opposing ends of the pin. The cartridge assembly further includes an outer bushing having first and second ends and a channel extending therethrough for accommodating a portion of the inner bushing disposed between the first and second ends of the inner bushing. The cartridge assembly also includes first and second inserts. Each insert has a channel extending therethrough for accommodating opposing portions of the inner bushing that extend beyond the outer bushing. The first insert engages the first end of the outer bushing and the second insert engages the second end of the outer bushing. The cartridge assembly also includes first and second collars, each having a channel extending therethrough for accommodating portions of the pin that extend beyond the inner bushing. And, the cartridge assembly may include a first thrust ring disposed between the first collar and the first insert and a second thrust ring may be disposed between the second collar and the second insert.

The first insert and first collar may be joined together or be formed as a single part. Similarly, the second insert and second collar may be joined together or be formed as a single part. Also, the thrust rings may be separate parts or be formed as part of the inserts, collars, inner bushing or a combination thereof.

In another example, a track chain in disclosed which includes a plurality of cartridge assemblies. Each cartridge assembly includes a pin that defines a longitudinal access and it has a lubricant channel. The pin includes first and second opposing ends. An inner bushing includes first and second ends and a channel extending therethrough for rotatably accommodating a portion of the pin disposed between the first and second opposing ends of the pin. An outer bushing is included that has first and second opposing ends and a channel extending therethrough for accommodating a portion of the inner bushing disposed between the first and second opposing ends of the inner bushing. The track chain also includes first and second inserts. Each insert has a channel extending therethrough for accommodating opposing portions of the inner bushing that extend beyond the outer bushing. The first insert engages the first end of the outer bushing while the second insert engages the second end of the outer bushing. Each cartridge assembly of the track chain also includes first and second collars. Each collar has a channel extending therethrough for accommodating portions of the pin that extend beyond the inner bushing. Each cartridge assembly of the track chain also includes a first thrust ring disposed between the first collar and the first insert and, similarly, a second thrust ring disposed between the second collar and the second insert. The first and second thrust rings each include inner and outer radial faces. The outer radial faces of the first and second thrust rings support first and second seals respectively. The inner radial face of the first and second thrust rings engage one of the pin or inner bushing. The first collar of each cartridge assembly of the track chain is accommodated in a first link. The second collar is accommodated in a second link. The first insert is accommodated in a third link and the second insert is accommodated in a fourth link.

In yet another example, a method for providing stiffness to a cartridge assembly of a track chain is disclosed. The method includes providing a pin defining a longitudinal access and having a lubricant channel. The pin includes first and second opposing ends. The method also includes inserting the pin into an inner bushing having first and second ends and a channel extending therethrough for rotatably accommodating a portion of the pin with the first and second opposing ends of the pin extending beyond the first and second opposing ends of the inner bushing respectively. The method also includes inserting the pin an inner bushing into an outer bushing having first and second opposing ends and the channel extending therethrough for accommodating a portion of the inner bushing with the pin and with the inner bushing extending beyond the first and second ends of the outer bushing. The method further includes coupling first and second inserts over opposing portions of the inner bushing that extend beyond the outer bushing and coupling the first insert to the first end of the outer bushing and coupling the second insert to the second end of the outer bushing. The method also includes coupling a first thrust ring to the pin and the first end of the inner bushing and coupling a second thrust ring to the pin in a second end of the inner bushing. The method also includes coupling the first and second collars to the first and second thrust rings respectively and to portions of the pin that extend beyond the inner bushing.

DETAILED DESCRIPTION

While the prior art track chain assemblies articulate around the sprocket and the idler, and thereby allow the work machine to be propelled over the ground, the prior art track chain assemblies suffer from several drawbacks. For example, the prior art track chain assemblies tend to be mechanically complex and are prone to structural problems. Specifically, the cartridge assemblies (bushings, pins, collars, seals and inserts) are difficult to manufacture and assemble and, further, lack sufficient axial stiffness to ensure a long working life. Therefore, a track chain assembly which overcomes the above-mentioned drawbacks is needed.

Figure 1:
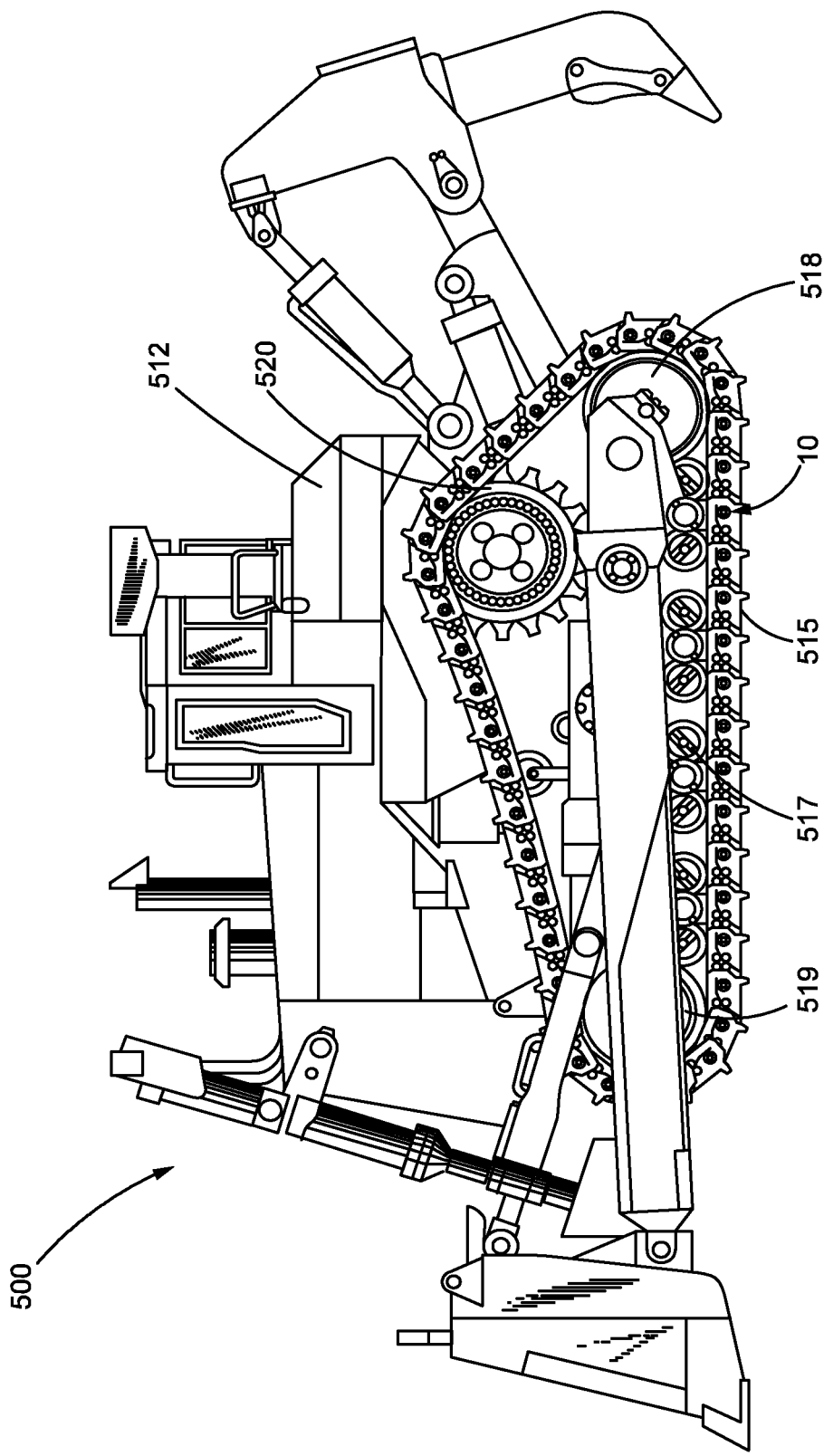
FIG. 1 is a side plan view of a track type machine that can incorporate the track chain cartridges disclosed herein.

Referring to FIG. 1, a track type machine 500 includes a machine body 512, having a drive sprocket 520 mounted to a side thereof. A track chain 514 extends about the drive sprocket 520, as well as a rear idler 518 and a front idler 519. The track chain 514 includes a plurality of links 515 movably coupled to two other links 515 via a sleeve bearing cartridge assembly 10. A plurality of track rollers 517 may be coupled with work machine body 512 and rotate against track chain 514 in a conventional manner. The machine 500 may include identical track chains, drive sprockets and idlers on opposite sides thereof, in a conventional manner. The machine 500 is illustrated as a relatively large "high drive" tractor, however, it should be appreciated that this disclosure is not thereby limited, and any of a wide variety of track type machines might be designed according to this disclosure.

Figure 2:
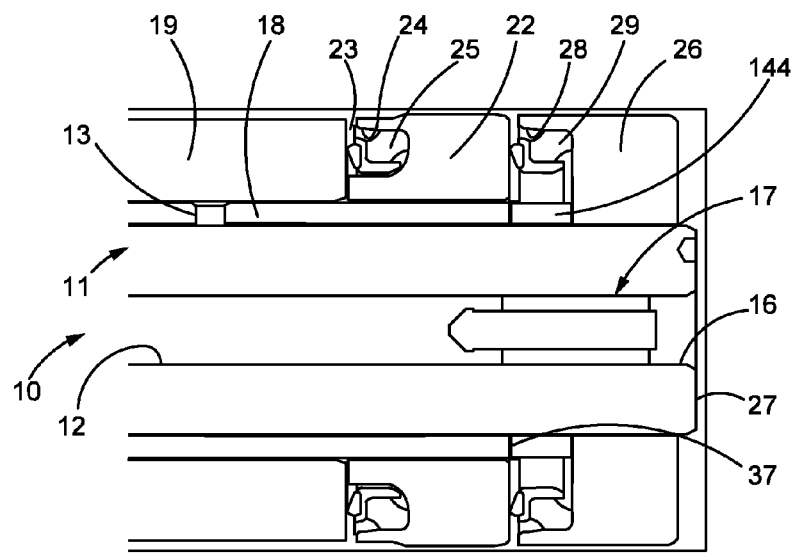
FIG. 2 is a partial sectional view of a disclosed cartridge assembly for a track chain.

FIG. 2 is a partial sectional view of a disclosed cartridge assembly 10. The cartridge assembly 10 includes a pin 11 that includes a lubricant channel 12 extending therethrough for accommodating lubricant and delivering lubricant to various other channels in the cartridge assembly 10, such as those shown at 13-15 in FIGS. 2 and 3. The pin 11 includes an opening 16 which is sealed with a plug assembly 17.

In the cartridge assembly 10 shown in FIG. 2, the pin 11 is accommodated within an inner bushing 18. The inner bushing 18 and pin 11 are then accommodated within an outer bushing 19. An insert 22 accommodates the pin 11 and inner bushing 18 and also engages an end 23 of the outer bushing 19. The insert 22 includes a recess 24 that accommodates a seal 25. The insert 22 is disposed between the outer bushing 19 and a collar 26. The collar 26 accommodates the end 27 of the pin 11 and also includes a recess 28 for accommodating a seal 29.

Figure 3:
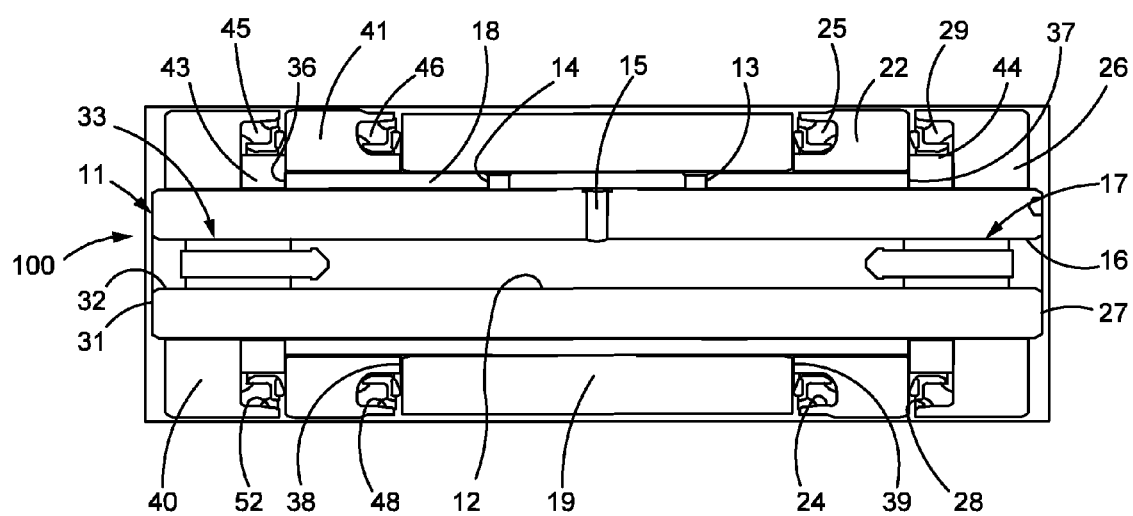
FIG. 3 is a sectional view of yet another disclosed cartridge assembly for a track chain.

A more complete illustration of a cartridge assembly 100 is illustrated in FIG. 3. The pin 11 includes first and second opposing ends 31, 27 respectively. Each end 31, 27 of the pin 11 includes an opening 32, 16 respectively that is sealed with a plug assembly 33, 17. The lubricant channel 12 serves as a reservoir for lubricant and also delivers lubricant through the channel 15 to the inner bushing 18 and through the channels 13, 14 to the outer bushing 19. The inner bushing 18 includes first and second opposing ends 36, 37 and the outer bushing 19 includes first and second opposing ends 38, 39 respectively.

In the cartridge assembly 100 shown in FIG. 3, the first and second inserts 41, 22 respectively engage the first and second opposing ends 38, 39 of the outer bushing 19 respectively and are also disposed on top of the inner bushing 18 near the first and second opposing ends 36, 37 respectively. The first and second inserts 41, 22 are also axially sandwiched between the outer bushing 19 and the first and second collars 40, 26 respectively or, more specifically, the first and second inserts 41, 22 are sandwiched between the outer bushing 19 and the first and second thrust rings 43, 44 and the first and second seals 45, 29 respectively. The first and second thrust rings 43, 44 support the seals 45, 29 and avoid the necessity of designing the inserts 41, 22 to accommodate or support the outer seals 45, 29. Similarly, the first and second inner seals 46, 25 are disposed in recesses 48, 24 in the inserts 41, 22 and engage the first and second opposing ends 38, 39 of the outer bushing 19 as shown in FIG. 3. Similarly, the first and second outer seals 45, 29 are accommodated in recesses 52, 28.

One problem associated with prior art cartridge assemblies 10 for track chains is the use of the inserts 41, 22 to accommodate and/or support the outer seals 45, 29. Normally such designs reduce the thickness of the inner bushing 18 which can compromise the structural integrity of the inner bushing 18. Compromising the structural integrity of the inserts 41, 22 can also compromise the inner box stiffness, which can lead to link walking, shoe bolt loosening and link cracking. A lack of strength in the inserts 41, 22 also compromises the axial stiffness of a cartridge assembly 10. Therefore, FIGS. 2-5 illustrate four variations, all of which preserve the integrity of the first and second inserts 41, 22 and provide improved inner box stiffness, reduced shoe bolt loosening, reduced link cracking and increased axial stiffness.

Returning to FIG. 2, the cartridge assembly 10 includes a single thrust ring 144 that engages the second opposing end 37 of the inner bushing 18. The single thrust ring 144 supports the seal 29 as shown. The insert 22 is not utilized for supporting the seal 29 in a radial direction, nor is there any need for an extension of the insert 22 for supporting the seal 29. In FIG. 3, the cartridge assembly 100 also includes single thrust rings 43, 44, but which are thicker than the thrust ring 144 shown in FIG. 1.

Figure 4:
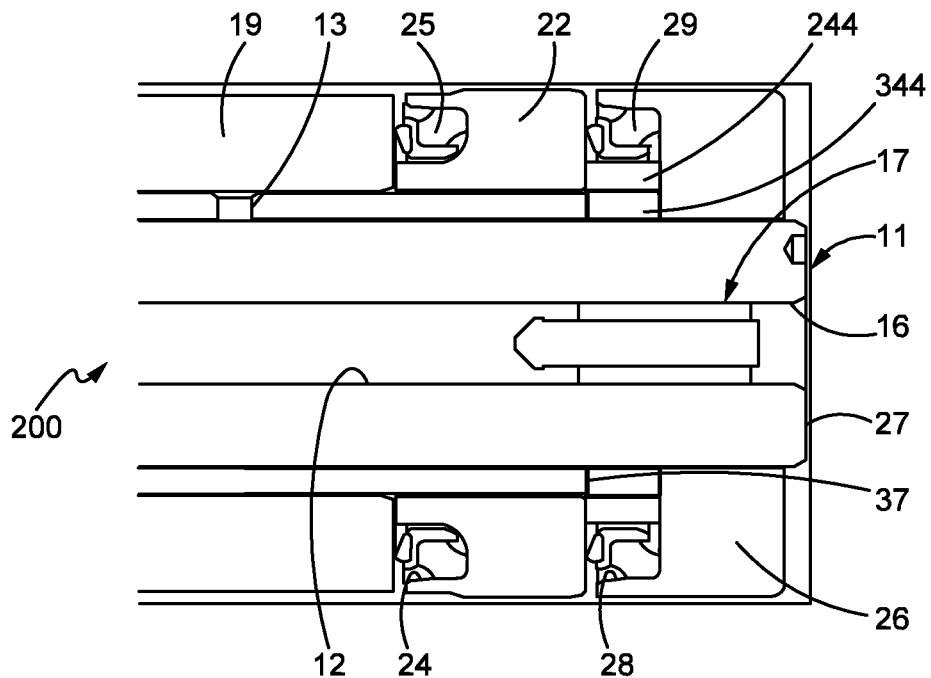
FIG. 4 is another partial sectional view of a disclosed cartridge assembly for a track chain.
Figure 5:
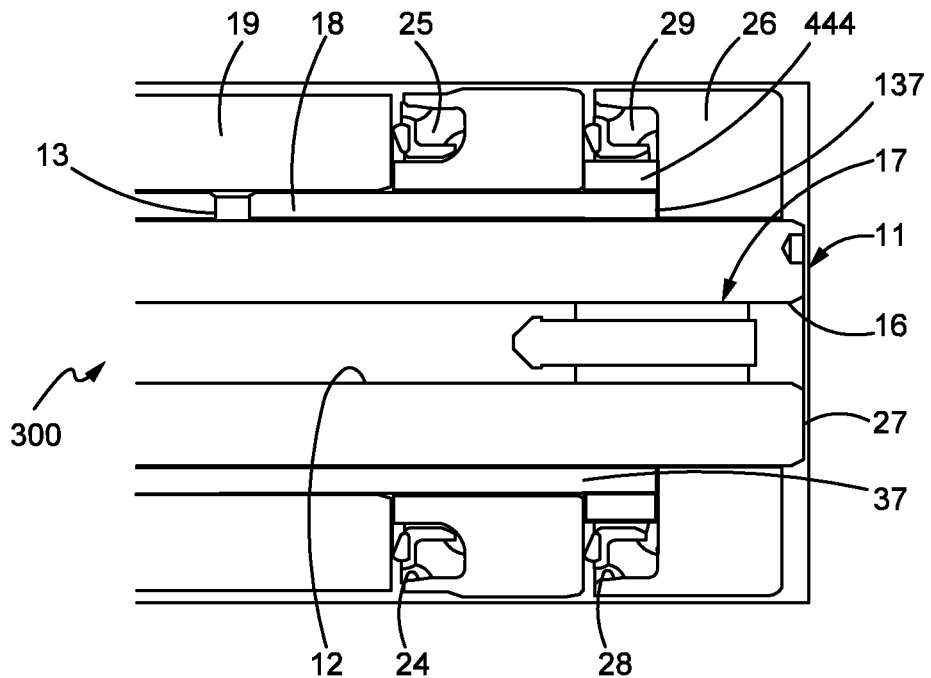
FIG. 5 is yet another partial sectional view of a disclosed cartridge assembly for a track chain.

Turning to FIGS. 4-5, the cartridge assembly 200 of FIG. 4 may feature inner and outer thrust rings 244, 344 respectively, or one thick thrust ring 244/344. Again, the insert 22 is not used or needed to support the seal 29. Turning to FIG. 5, instead of the thrust ring 444 engaging the pin 11 the thrust ring 444 rides on top of the inner bushing 18. In the cartridge assembly 300 shown in FIG. 5, the end 137 of the inner bushing 18 has been extended so it passes through the thrust ring 444.

The insert 22 and collar 24 may be joined together or be formed as a single, unitary part. Similarly, the insert 41 and collar 40 may be joined together or be formed as a single part. Also, the thrust rings 43, 44, 144, 244/344, 444 may be separate parts or be formed as part of the inserts 41, 22, collars 40, 26, inner bushing 18 or a combination thereof.

INDUSTRIAL APPLICABILITY

The four cartridge assemblies 10, 100, 200, 300 are illustrated that provide improved inner box stiffness, reduced link walking, reduced shoe bolt loosening, reduced link cracking and improved axial stiffness. And improved these advantages, without being bound to any particular theory, may be the result of the use of thrust rings 43, 44, 144 for supporting the outer seals 45, 29 as opposed to using a portion of the inserts 41, 26 for the same function.

A method for providing stiffness to a cartridge assembly 10 of a track chain 514 is also disclosed. The method includes providing a pin 11 that has a lubricant channel 12 and first and second opposing ends 31, 27. The pin 11 is inserted into an inner bushing 18 that also has first and second opposing ends 36, 37. The inner bushing 18 also has a channel 15 extending therethrough for rotatably accommodating a portion of the pin 11 with the first and second opposing ends 31, 27 of the pin 11 extending beyond the first and second opposing ends 36, 37 of the inner bushing 18. The pin 11 and the inner bushing 18 are then inserted into an outer bushing 19 which also has first and second opposing ends 38, 39. The opposing ends 36, 37 of the inner bushing 18 and the opposing ends 31, 27 of the pin 11 both extend beyond the opposing ends 38, 39 of the outer bushing 19. The first and second inserts 41, 22 are coupled over opposing portions of the inner bushing 18 that extend beyond the outer bushing 19 and the first insert 41 is coupled to the first end 38 of the outer bushing 19 and the second insert 22 is coupled to the second end 39 of the outer bushing 19. A first thrust ring 43 is coupled to the pin 11 and the first end 36 of the inner bushing 18. Similarly, a second thrust ring 44 is coupled to the pin 11 and the second end 37 of the inner bushing 18.

What is claimed is:

1. A cartridge assembly for a track chain, comprising:
   a pin defining a longitudinal axis and having a lubricant channel, the pin including first and second opposing ends;
   an inner bushing having first and second ends and a channel extending therethrough for rotatably accommodating a portion of the pin, the inner bushing having a uniform thickness between the first and second ends, the inner bushing being disposed between the first and second opposing ends of the pin;
   an outer bushing having first and second opposing ends and a channel extending therethrough for accommodating a portion of the inner bushing, the outer bushing being disposed between the first and second opposing ends of the inner bushing;
   first and second inserts, each having a channel extending therethrough for accommodating portions of the inner bushing that extend beyond the outer bushing, the first insert engaging the first end of the outer bushing, the second insert engaging the second end of the outer bushing;
   first and second collars, each having a channel extending therethrough for accommodating portions of the pin that extend beyond the inner bushing; and
   first and second thrust rings, the first thrust ring being disposed adjacent to the pin and between the first collar and the first insert, the second thrust ring being disposed adjacent to the pin and between the second collar and the second insert,
   wherein an outer diameter of the first thrust ring is greater than an outer diameter of the inner bushing, and wherein an outer diameter of the second thrust ring is greater than the outer diameter of the inner bushing.

2. The cartridge assembly of claim 1, further including a first seal disposed between the first collar and the first insert and a second seal disposed between the second collar and the second insert.

3. The cartridge assembly of claim 1, wherein the first and second opposing ends of the pin each accommodate a plug.

4. The cartridge assembly of claim 1, further including a first seal axially sandwiched between the first collar and the first insert and a second seal axially sandwiched between the second collar and the second insert, the first seal being radially sandwiched between the first collar and the first thrust ring, the second seal being radially sandwiched between the second collar and the second thrust ring.

5. The cartridge assembly of claim 1, wherein the first collar has an axially facing inner face with at least one recess for accommodating a first seal and the first thrust ring, and the second collar has an axially facing inner face with at least one recess for accommodating a second seal and the second thrust ring.

\* \* \* \* \*